United States Patent [19]

Minamizawa

[11] Patent Number: 5,280,369

[45] Date of Patent: Jan. 18, 1994

[54] FACSIMILE EQUIPMENT

[75] Inventor: Fumihiro Minamizawa, Nagoya, Japan

[73] Assignee: Brother Kogyo Kabushiki Kaisha, Nagoya, Japan

[21] Appl. No.: 718,651

[22] Filed: Jun. 21, 1991

[30] Foreign Application Priority Data

Jul. 16, 1990 [JP] Japan ................... 2-185237

[51] Int. Cl.$^5$ .............................. H04N 1/04
[52] U.S. Cl. .................... 358/479; 359/400
[58] Field of Search ............ 358/400, 401, 403, 444, 358/479; 340/723

[56] References Cited

U.S. PATENT DOCUMENTS

| | | | |
|---|---|---|---|
| 4,297,727 | 10/1981 | Ogawa et al. | 358/261.4 |
| 4,437,127 | 3/1984 | Hirose | 358/401 |
| 4,620,289 | 10/1986 | Chauvel | 340/723 |
| 4,769,719 | 9/1988 | Endo | 358/444 |
| 4,829,453 | 5/1989 | Katsuta | 340/723 |
| 4,901,063 | 2/1990 | Kimura et al. | 340/723 |
| 5,010,324 | 4/1991 | Yamamoto | 340/723 |

*Primary Examiner*—Edward L. Coles, Sr.
*Assistant Examiner*—Jerome Grant, II
*Attorney, Agent, or Firm*—Oliff & Berridge

[57] ABSTRACT

A facsimile equipment including an image data storing RAM for storing communication image data sets, a liquid crystal display for displaying the image data, numeral keys for designating a desired one of the image data sets stored in the image data storing RAM and demanding display of the desired image data set on the liquid crystal display, a search controller for searching an address corresponding to a line including the first pixel bit in the designated image data, and a display controller for reading the designated image data set stored at the searched address and the subsequent addresses by an amount equal to the number of bits displayable on the liquid crystal display and displaying the image data read on the liquid crystal display.

15 Claims, 4 Drawing Sheets

FIG. 3B

| S1 | ANY KEY DEPRESSED ? |
|---|---|
| S2 | DISPLAY DEMAND KEY ? |
| S3 | DISPLAY MANAGEMENT INFORMATION |
| S4 | IMAGE DATA TO BE DISPLAYED SELECTED ? |
| S5 | SELECTION CORRECT ? |
| S6 | DISPLAY ERROR MESSAGE |
| S7 | READ INFORMATION IN POINTER AREA |
| S8 | DECODE ONE-LINE IMAGE DATA |
| S9 | BLACK PIXEL EXIST IN ONE LINE ? |
| S10 | ONE-PAGE SEARCH ENDED ? |
| S11 | DISPLAY ERROR MESSAGE |
| S12 | TRANSFER LINE DATA TO DISPLAY DEVICE |
| S13 | DISPLAYABLE BIT NUMBER FILLED ? |
| S14 | PRINT DEMAND KEY ? |
| S15 | OTHER PROCESSING |
| S16 | IMAGE DATA TO BE DISPLAYED SELECTED ? |
| S17 | SELECTION CORRECT ? |
| S18 | READ INFORMATION IN POINTER AREA |
| S19 | PRINT ALL SELECTED IMAGE DATA |

FACSIMILE EQUIPMENT

BACKGROUND OF THE INVENTION

1. Field of the Invention

The present invention relates to a facsimile equipment, and more particularly to a facsimile equipment capable of selectively displaying the content of image information stored in an image information storing device.

2. Description of the Related Art

In a conventional facsimile equipment having an image information storing device capable of storing image information to be transmitted and image information received, an operator can acknowledge information concerning the input date and the input time stored in the image information storing device. However, the operator cannot acknowledge the content of the communication image information stored in the image information storing device. Accordingly, the operator must print the communication image information. Further, it is to be noted that the communication image information mentioned in this specification connotes image information corresponding to the essential communication content exclusive of the information of the input date and time.

However, in general, it is unnecessary to print communication image information stored in the image information storing device that has been erroneously addressed or is of little importance to the operator. Accordingly, the printing of all the communication information stored in the image information storing device irrespective of the fact that the information includes erroneously addressed or unimportant content causes an increase in running cost and a loss of printed paper.

SUMMARY OF THE INVENTION

It is accordingly an object of the present invention to provide a facsimile equipment which can display a significant portion of the communication image information stored in an image information storing means, thereby helping an operator to readily review the content of the communication image information stored in the image information storing means and quickly print the desired or important communication image information rather than all received or input communications.

According to the present invention, there is provided a facsimile equipment comprising image information storing means for storing communication image information in message or communication sets, display means for displaying the communication image information stored in the image information storing means, display demand means for selectively designating a desired one of the communication image information sets stored in the image information storing means and demanding display of the desired image information set on the display means, search means for searching an address corresponding to a first line including a pixel bit in the communication image information designated according to display demand by the display demand means, reading means for reading from the image information storing means the designated communication image information set stored at the searched address and the subsequent addresses by an amount equal to the number of bits displayable on the display means, and display control means for controlling the display means to display the communication image information read by the reading means.

In the facsimile equipment constructed above, when display of desired communication image information set is demanded by the display demand means, the desired communication image information set designated according to the display demand is selected from the communication image information stored in the image information storing means. Then, an address corresponding to the first line including a pixel bit in the selected communication image information is searched by the search means. The selected communication image information is displayed from the searched address and the subsequent addresses by an amount equal to the number of bits displayable by the display means under the control by the display control means.

As described above, a significant portion of the communication image information including a pixel bit is searched from the communication image information stored in the image information storing means. Then, the significant portion searched above is displayed on the display means. Thus, the significant portion of the communication image information is efficiently displayed. Accordingly, even if the display capacity of the display means is small, such that the communication information can only be partially displayed, an operator can easily evaluate the content of the entire communication image information from the displayed content. As a result, after viewing the displayed content on the display means, the operator can quickly output only the desired communication image information sets on a recording means such as printing paper, thereby reviewing the whole content of the desired communication image information. Accordingly, the remaining communication image information set(s), unnecessary or unimportant the operator, is (are) not output on the recording means, but can be reliably stored in the communication image information storing means in the facsimile equipment, with the result that it is possible to reduce recording paper usage by not printing the unnecessary communication image information set(s).

BRIEF DESCRIPTION OF THE DRAWINGS

The present invention will be more clearly understood from the description as set forth below with reference to the accompanying drawings, wherein:

FIG. 3B is a table of labels for the flowchart of FIG. 3A.

DESCRIPTION OF THE PREFERRED EMBODIMENT

There will now be described a preferred embodiment of the present invention with reference to the drawings.

Figure 1:
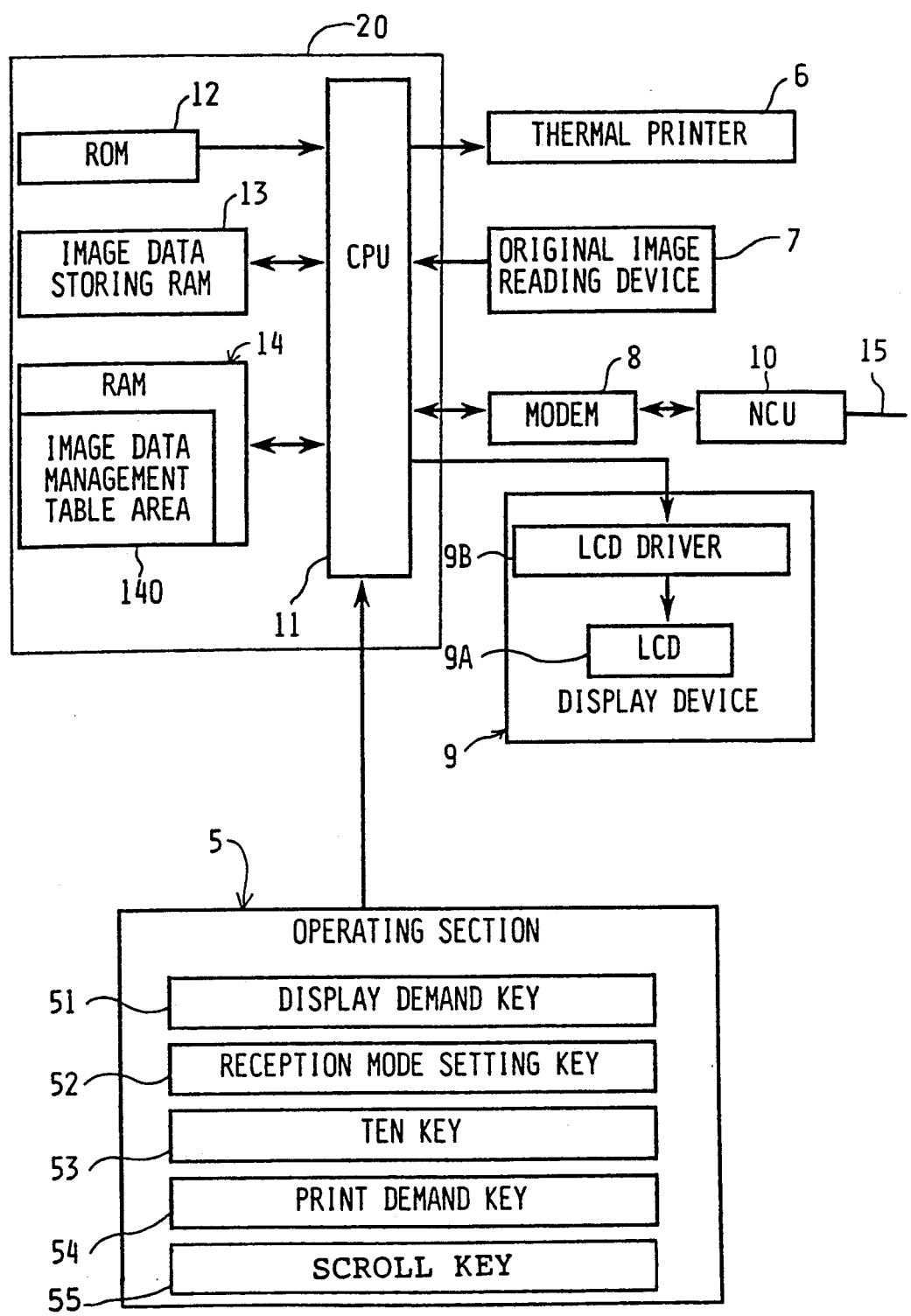
FIG. 1 is a block diagram illustrating a construction of a preferred embodiment of the present invention.

FIG. 1 shows a schematic construction of the facsimile equipment according to the preferred embodiment, the facsimile equipment including a control section 20 comprising a central processing unit (which will be hereinafter referred to as CPU) 11 for controlling the facsimile equipment according to a predetermined program, a ROM 12 for storing various programs inclusive of a control program for carrying out the transmitting and receiving of information according to a predetermined transmission and reception procedure based on a recommendation of the CCITT (International Telegraph and Telephone Consultative Committee) and also including a display control program, an image data storing RAM 13 for storing image data, and a RAM 14 having an image data management table area 140 and a working area. The image data management table area 140 (FIG. 2) has a management number storing area 141, an input date and time storing area 142, a transmission and reception flag area 143, and a pointer storing area 144 corresponding to the image data stored in RAM 13.

The facsimile equipment further includes an operating section 5 comprising a display demand key 51 for demanding display of the image data stored in the image data storing RAM 13, a transmission and reception mode setting key 52, numeral keys 53 comprising the ten (0 to 9) numeral keys for inputting information inclusive of telephone number information and selected information of the image data to be displayed, a print demand key 54 for demanding print of the image data stored in the image data storing RAM 13 and scroll keys 55. Upon receipt of an output from the operating section 5, the control section 20 controls a thermal printer 6 for printing the image information, an original image reading device 7 for reading an original image, a modem 8, and a display device 9 consisting of a liquid crystal display 9A having a display capacity corresponding to one-fourth of an A4-sized paper page and a liquid crystal display driver 9B for driving the liquid crystal display 9A.

The display device 9 serves to display information according to data read from the image data storing RAM 13. The construction of the display device 9 is similar to that used in a general word processor as is well known in the art. The modem 8 is connected through a network control unit (which will be hereinafter referred to as NCU) 10 to a telephone line 15.

Upon receipt of a transmitting instruction from the mode setting key 52, the control section 20 controls the reading device 7 to read an original image from a contact image sensor of an optical type as conventionally used in a general facsimile equipment. The information of the original image read by the reading device 7 is converted into a binary image data in the reading device 7. The CPU 11 encodes this image data according to a coding procedure stored in the ROM 12. The coding procedure is based on protocols of the CCITT. This coding procedure is a general procedure as disclosed in U.S. Pat. No. 4,297,727, for example. The modem 8 modulates the coded image data so as to make the coded data suitable to communication using the telephone line 15, and feeds the modulated image data through the NCU 10 to the telephone line 15, thereby transmitting the image data to receiver facsimile equipment. Alternatively, the image data coded by the CPU 11 may be stored into the image data storing RAM 13, and thereafter it may be sequentially read out from the image data storing RAM 13 to be fed to the modem 8. Such a transmission of data through the image data storing RAM 13 will be hereinafter referred to as memory transmission.

In the case of receiving image data from the telephone line 15, the image data is input through the NCU 10 to the modem 8 under the control of the control section 20. Thereafter, the image data is demodulated in the modem 8, and is then decoded according to a procedure stored in the ROM 12. The decoded image data can then be transferred to the thermal printer 6 and printed thereby on a recording medium. The thermal printer 6 is a known thermal printer conventionally used in facsimile equipment. Alternatively, the received image data may be stored in the image data storing RAM 13 and may then be read from the image data storing RAM 13 to be decoded and transferred to the thermal printer 6. The material may be printed sequentially or under operator control as described below. Such a reception of data through the image data storing RAM 13 will be hereinafter referred to as memory reception.

The image data stored into the image data storing RAM 13 in the cases of the memory reception and the memory transmission are managed by an image data management table stored in the management table area 140 of the RAM 14.

Figure 2:
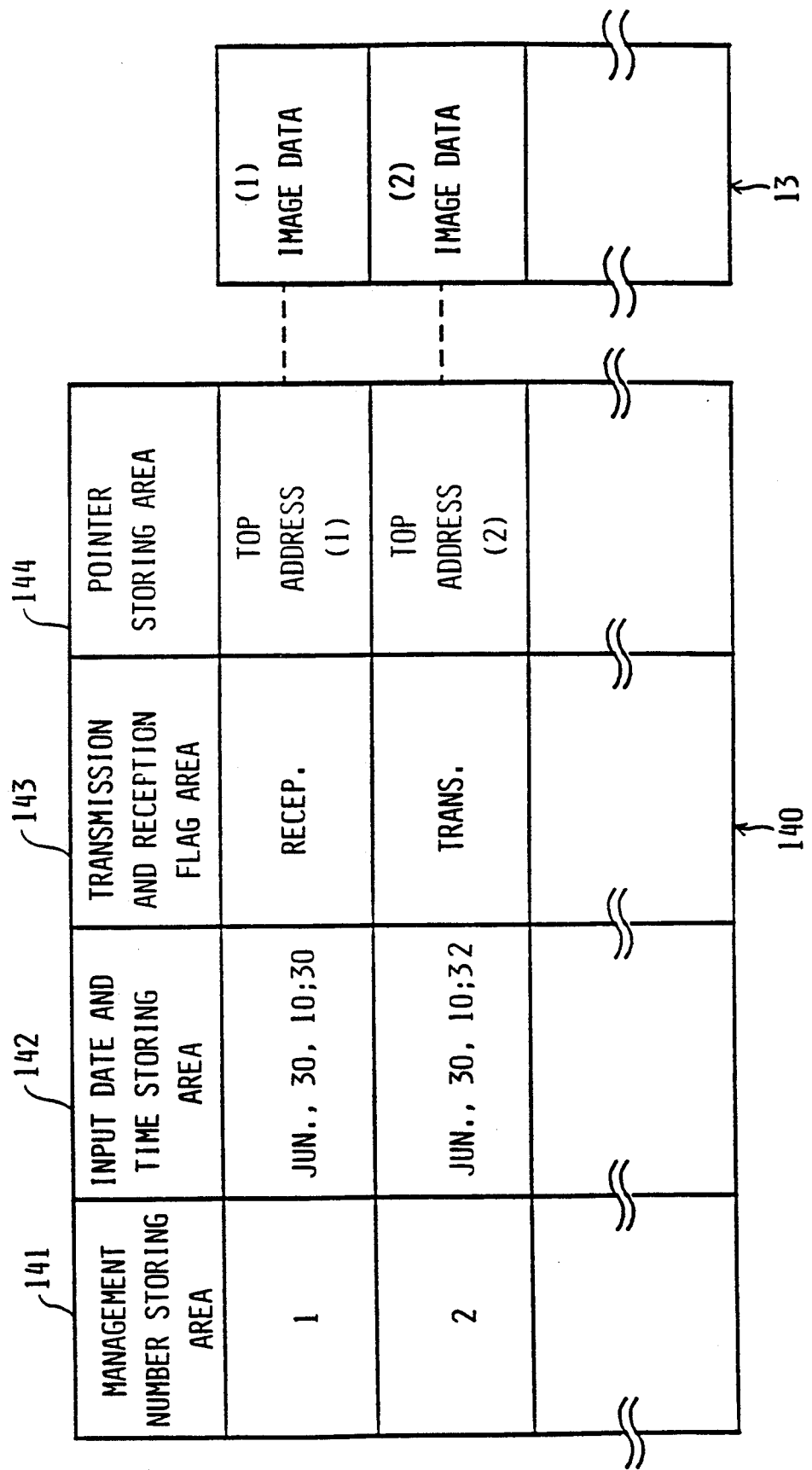
FIG. 2 is a schematic illustration of a content in a management table area and a relation between the management table area and an image data.

FIG. 2 schematically shows the structure of the management table area 140. The figure also shows the relationship between the image data stored in the image data storing RAM 13 and the image data management table stored in the management table area 140 of the RAM 14.

In the case of memory reception, the CPU 11 controls the RAMs 13 and 14 to store the received image data and various other control information, respectively, in the following manner. That is, the received image data is stored into the image data storing RAM 13. Information of a management number corresponding to the received image data is stored into the management number storing area 141. Information of the input date and the input time, corresponding to the date and time the image data is received or transmitted is stored into the input date and time storing area 142. A reception flag is stored into the transmission and reception flag area 143. Information indicative of a storage location of the received image data in the image data storing RAM 13 is stored into the pointer storing area 144.

In the case of the memory transmission, upon receipt of a memory transmission instruction output from the mode setting key 52, the CPU 11 controls the RAMs 13 and 14 to store the image data to be transmitted and the control information, respectively, in the following manner. That is, the image data to be transmitted is stored into the image data storing RAM 13. A management number corresponding to the image data to be transmitted is stored into the management number storing area 141 and an input date and an input time corresponding to the image data to be transmitted is stored into the input date and time storing area 142. A transmission flag is stored into the transmission and reception flag area 143. Lastly, the storage location of the image data to be transmitted in the image data storing RAM 13 is stored into the pointer storing area 144. In this manner, the storage of the image data to be transmitted from or to the image data storing RAM 13 and the creation of the image data management table are effected. The information stored in the pointer storing area 144 is a top address of the image data set received or to be transmitted that is stored in the image data storing RAM 13.

Figure 3A:
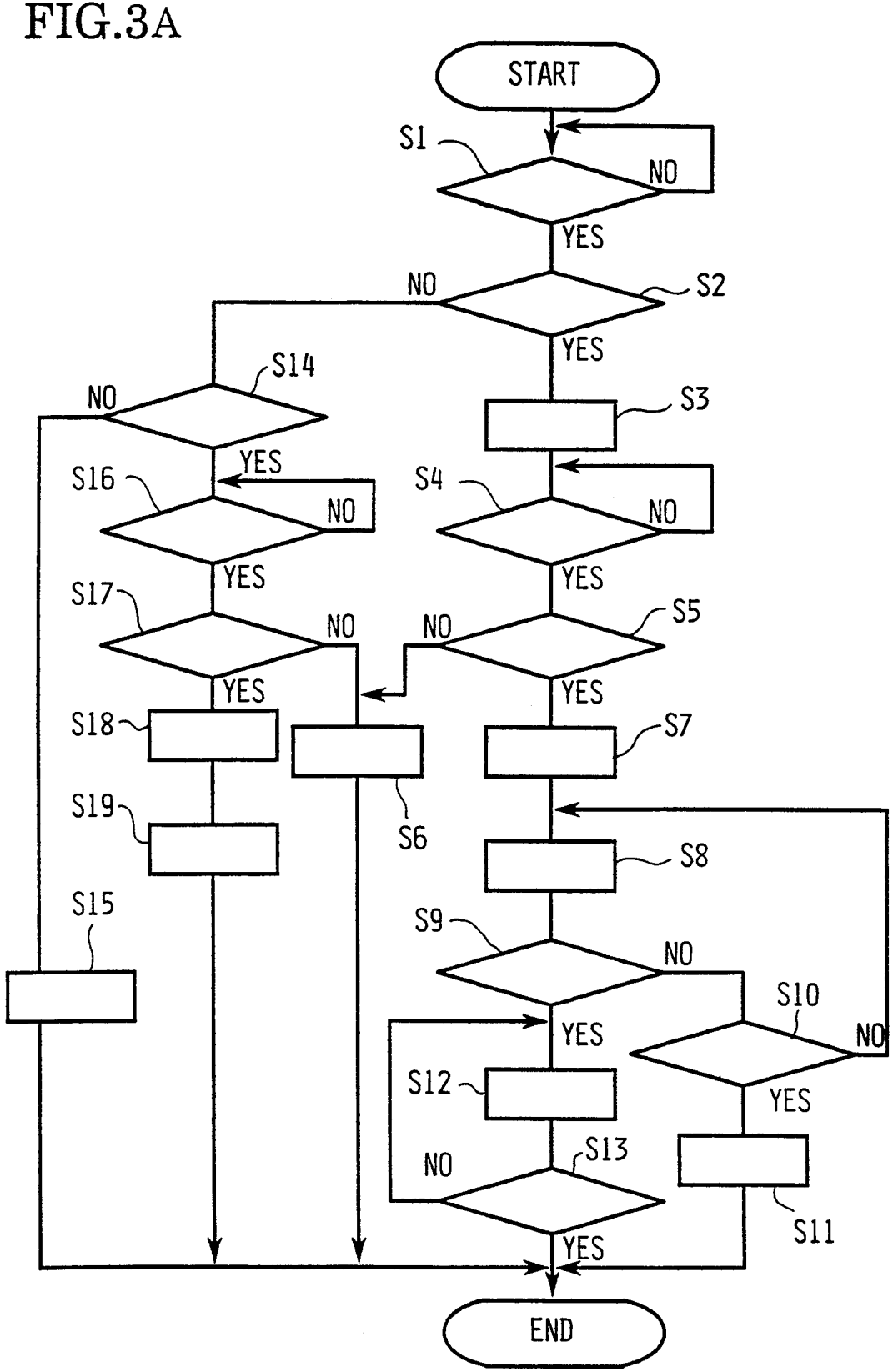
FIG. 3A is a flowchart showing the operation of the preferred embodiment.

The operation of the preferred embodiment as constructed above will now be described with reference to the flowchart shown in FIGS. 3A and 3B.

The CPU 11 scans an output from each key in the operating section 5 (step S1) to check whether or not any key has been depressed. If the CPU 11 determines that the display demand key 51 has been depressed (step S2), it refers to the image data management table (FIG. 2) and displays on the display device 9 the management information recorded in the image data management table (step S3). Then, the operator selects the image data to be displayed (step S4). The selection of the image data to be displayed is made by depressing any numeral key or combination of keys of the ten-key 53 corresponding to a management number. To view the complete contents of the image management data table it may be necessary to use the scroll keys 55 to move up and down the table prior to making a selection.

If the CPU 11 determines in step S4 that a numeral key, or combination of numeral keys, 53 has been depressed, it checks whether or not the number of the numeral key depressed corresponds to a management number recorded in the image data management table (step S5). If the CPU 11 determines in step S5 that the number of the numeral key depressed does not correspond to a management number, it displays an error message on the display device 9 (step S6). If the CPU 11 determines in step S5 that the number of the numeral key depressed corresponds to a management number, it reads the information stored in the pointer storing area 144 corresponding to the management number. In other words, the CPU 11 reads a top address of a desired image data stored in the image data storing RAM 13 (step S7). Then the CPU 11 fetches the image data of one line from the image data storing RAM 13 in accordance with the top address read in step S7, and decodes the fetched one-line image data (step S8) and stores it in the working area of RAM 14. In the image data storing RAM 13, the image data is stored in a coded state to save on storage capacity. Therefore, the coded image data in the RAM 13 is decoded from the top address into a line data according to a decoding procedure based on protocols of the CCITT. Then, the CPU 11 reads the line data byte by byte and checks whether or not a read byte is zero to thereby search whether or not a black pixel bit, indicating the start of the next message, exists in the one-line image data (step S9). If the CPU 11 determines in step S9 that no black pixel bits exist in the one-line image data, then it decodes the next one-line image data and similarly checks whether or not a black pixel bit exists in the image data of the current line. In this manner, the CPU 11 checks the existence of a black pixel bit in one page by iteratively executing the steps S8, S9 and S10. If the CPU 11 determines in step S10 that no black pixel bit exists in one page, it displays an error message on the display device 9 (step S11).

In step S9, if the CPU 11 finds a line data that includes a black pixel bit, it reads the line data stored at the searched address and the subsequent addresses by an amount equal to the number of bits displayable by the display device 9, and transfers the line data to the display device 9 (steps S12 and S13). If the image data is larger than the number of bits displayable by the display device 9, the display of a portion of the image data exceeding the number of bits displayable is canceled. If the image data is smaller than the number of bits displayable, white pixel bits are inserted after the final image data to fill a display area of the display device 9.

Generally, a top portion of the image data is constituted of information about the receiver and the transmitter. Accordingly, the display of the top portion of the image data on the display device 9 by the above operation greatly helps the receiver to determine the significance of the entire contents of the image data received.

Further, in step S4, if the number of the numeral key depressed corresponds to the management number at which a transmission flag is ON, the image data ready for the memory transmission is displayed on the display device 9. In this case, the operator can confirm the content of the image data to be transmitted.

As another way of searching for a black pixel bit, it may be considered to construct the hardware such that a shift register is combined with a flip flop, which is set by an output from the shift register, and let the CPU 11 determine an output from the flip flop. In this case, the burden on the software can be reduced resulting in an increase in search speed.

In the case where the operator determines the image data displayed is to be printed, after execution of the above processing, the operator depresses the print demand key 54. In step S14, if the CPU 11 determines that the depressed key is the print demand key 54, it executes steps S16 and S17 similar to the steps S4 and S5, respectively. That is, the CPU 11 checks whether or not the management number in the image data management table 140 has been correctly designated. If the management number is correctly designated, the CPU 11 reads the information stored in the pointer storing area 144 in the same manner as in step S7 (step S18). Then, the CPU 11 reads all the designated image data from the image data storing RAM 13 as described above and controls the thermal printer 6 to print the read image data. Further, if the CPU 11 determines in step S14 that the depressed key is not the print demand key 54, it executes other processing corresponding to the depressed key.

Although the present invention has been shown and described in terms of the preferred embodiment, it should not be particularly limited thereby, since the details of the embodiment could be varied without departing from the ambit of the present invention.

What is claimed is:

1. A facsimile equipment, comprising:
communication means for transmitting and receiving communication image data;
image information storing means for storing the communication image data;
display means for displaying the communication image data stored in the image information storing means;
management data storing means for storing management data related to each communication image data stored in said image information storing means, said display means also for displaying the management data wherein said management data includes at least one of a numeric message identifier, a data/time group and a memory transmit/receive status;
display demand means for selectively designating a desired communication image data stored in the image information storing means and demanding display of the desired communication image data on the display means;
search means for searching an address corresponding to a line including a pixel bit in the desired communication image data designated according to a display demand by the display demand means;
reading means for reading from the image information storing means the designated desired communication image data stored at the searched address and the subsequent addresses by an amount equal to the number of bits displayable on the display means; and display control means for controlling the display means to display the communication image data read by the reading means, wherein after said display means displays the management data and a desired management data is selected by an operator, said display demand means is executed to designate the desired communication image data for display on the display means.

2. A facsimile equipment as claimed in claim 1, wherein the communication image data is stored in sets, each set corresponding to an incoming or an outgoing message.

3. A facsimile equipment as claimed in claim 2, further comprising a print means for printing a set of communication image data displayed.

4. A facsimile machine, comprising:
a communication interface;
a memory storage comprising a read only memory and at least one random access memory;
a display device;
a printer;
a key pad; and
a control processor electronically linking and controlling said communication interface, said memory storage, said display device, said printer and said key pad; and
sets of image data stored in said at least one random access memory such that an operator may designate one of said sets of image data for display on said display device for review prior to printing, wherein each of said sets of image data corresponds to a receiving or a transmitting message.

5. A facsimile machine as claimed in claim 4, wherein said at least one random access memory comprises a first RAM for storing each set of image data and a second RAM for storing management data related to each set of image data and providing a data work area.

6. A facsimile machine as claimed in claim 5, wherein said key pad comprises:
at least ten numeric keys;
a display key;
a print key;
a transmit key; and
means for designating memory transmit.

7. A facsimile machine as claimed in claim 6, wherein depressing said display key produces a display on said display device of management data to include at least one of a numeric message identifier, a date/time group and a memory transmit/receive status for each set of image data in said first RAM.

8. A facsimile machine as claimed in claim 7, wherein said numeric keys provide means for directing a set of image data to a remote receiver, identifying a set of image data for display, and designating a set of image data for printing.

9. A facsimile machine as claimed in claim 5, wherein said display device displays a portion of the set of image data of up to one-quarter of an A4 page size.

10. A facsimile machine as claimed in claim 4, wherein said communication interface links with a telephone transmission system.

11. A facsimile machine, comprising:
a message storage area for storing at least one set of image data;
a transmission and reception interface;
a printer;
a key pad having at least ten numeric keys, a display key, a print key, a transmit key, and means for designating memory transmit;
a control unit; and
a display device for display of one of the at least one set of image data as stored in said storage area, wherein depressing said display key produces a display on said display device of management data to include at least one of a numeric message identifier, a date/time group and a memory transmit/receive status for each set of image data in said message storage area and after at least one of the numeric message identifier, the data/time group and the memory transmit/receive status for each set of image data is displayed on said display device responsive to said display key, the set of image data corresponding to the management data designated by an operator is displayed on said display.

12. A facsimile machine as claimed in claim 11, wherein said display device can display a lead portion of the message set equivalent to that which would occupy up to one-quarter of an A4 size printed page.

13. A facsimile machine as claimed in claim 11, wherein said at least one random access memory comprises a first RAM for storing each set of image data and a second RAM for storing management data related to each set of image data and providing a data work area.

14. A facsimile machine as claimed in claim 11, wherein said transmission and reception interface links with a telephone transmission system.

15. A facsimile machine as claimed in claim 11, wherein said numeric keys provide means for directing a set of image data to a remote receiver, identifying a set of image data for display, and designating a set of image data for printing.

* * * * *